(12) United States Patent
Matsumoto (10) Patent No.: US 10,567,337 B2
(45) Date of Patent: Feb. 18, 2020

(54) NETWORK ADDRESS DUPLICATION MANAGEMENT

(71) Applicant: CANON KABUSHIKI KAISHA, Tokyo (JP)

(72) Inventor: Akinobu Matsumoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 96 days.

(21) Appl. No.: 15/460,310

(22) Filed: Mar. 16, 2017

(65) Prior Publication Data
US 2017/0272403 A1    Sep. 21, 2017

(30) Foreign Application Priority Data

Mar. 16, 2016  (JP) ................................. 2016-052966

(51) Int. Cl.
| | | |
|---|---|---|
| *H04L 29/12* | (2006.01) | |
| *H04L 29/08* | (2006.01) | |
| *H04W 84/12* | (2009.01) | |
| *H04W 76/11* | (2018.01) | |
| *H04W 76/30* | (2018.01) | |

(52) U.S. Cl.
CPC ...... *H04L 61/2046* (2013.01); *H04L 61/2015* (2013.01); *H04L 61/6077* (2013.01); *H04L 67/104* (2013.01); *H04W 76/11* (2018.02); *H04W 76/30* (2018.02); *H04W 84/12* (2013.01)

(58) Field of Classification Search
None
See application file for complete search history.

(56) References Cited

U.S. PATENT DOCUMENTS

| | | | | |
|---|---|---|---|---|
| 2004/0258007 A1* | 12/2004 | Nam | ................. | H04L 29/12264 370/310 |
| 2005/0198357 A1* | 9/2005 | Fujita | ................. | H04L 12/2807 709/232 |
| 2006/0092839 A1* | 5/2006 | Dunko | ................. | H04W 76/12 370/230 |
| 2008/0250123 A1* | 10/2008 | Chae | ................. | H04L 29/12028 709/220 |
| 2009/0156201 A1* | 6/2009 | Pudney | ................. | H04W 64/00 455/426.1 |
| 2010/0228979 A1* | 9/2010 | Kudo | ..................... | H04L 63/08 713/168 |
| 2013/0166737 A1* | 6/2013 | Christenson | ............ | H04L 69/40 709/224 |

(Continued)

FOREIGN PATENT DOCUMENTS

JP    2015-130579 A    7/2015

*Primary Examiner* — Jeffrey M Rutkowski
*Assistant Examiner* — Andre Tacdiran
(74) *Attorney, Agent, or Firm* — Carter, DeLuca & Farrell LLP (57) ABSTRACT

A communication apparatus has a first interface for connecting with a first network and a second interface for connecting with a second network. The communication apparatus detects that an address used in the first network is changed, and furthermore, when it detects that the address that is changed in the first network duplicates an address being used in the second network, disconnects a connection of a link layer with the second network, and after the disconnection, reconstructs the second network using an address which is not duplicated by the changed address.

12 Claims, 5 Drawing Sheets

(56) References Cited

U.S. PATENT DOCUMENTS

| | | | |
|---|---|---|---|
| 2015/0029959 A1* | 1/2015 | Da | H04W 72/082 370/329 |
| 2015/0095505 A1* | 4/2015 | Antony | H04L 61/2007 709/228 |
| 2016/0094958 A1* | 3/2016 | Thakur | H04W 76/14 370/338 |
| 2016/0127309 A1* | 5/2016 | Yun | H04W 4/70 709/245 |
| 2016/0323694 A1* | 11/2016 | Cui | H04L 47/12 |
| 2017/0005981 A1* | 1/2017 | Wang | H04L 45/64 |

* cited by examiner

NETWORK ADDRESS DUPLICATION MANAGEMENT

BACKGROUND OF THE INVENTION

Field of the Invention

The present invention relates to a communication apparatus having a plurality of communication interfaces and a method of controlling the same.

Description of the Related Art

In recent years, wireless LAN systems as typified by IEEE 802.11 have been widely used. In wireless LAN systems, an infrastructure mode in which communication is performed via an access point (hereinafter referred to as an AP) that manages a wireless network is typically used. Meanwhile, a technique by which it is possible to implement peer-to-peer communication (hereinafter referred to as P2P communication) that does not go through an intermediary apparatus such as an AP, using a connection configuration such as Wi-Fi Direct (WFD) established by the Wi-Fi Alliance is spreading. Also, there are communication apparatuses having a plurality of network interfaces such as an interface that performs communication in a wireless LAN infrastructure mode and an interface that performs P2P communication using a technique such as Wi-Fi Direct. In such a communication apparatus, it is possible to execute P2P communication by one network interface simultaneously to executing infrastructure mode communication in another network interface.

An infrastructure network is configured by an AP and a communication apparatus in an infrastructure mode. In the data communication in the infrastructure network, a routable address that is assigned by a DHCP server function that is built into the AP or a DHCP server in the LAN is typically used. DHCP means Dynamic Host Configuration Protocol. Meanwhile, in P2P communication, a P2P network is constructed using addresses decided between the communication apparatuses. In the case of communication using Wi-Fi Direct, IP communication on the P2P network is realized by the communication apparatus that became the group owner (GO) using a DHCP server function to assign an address to another communication apparatus. IP means Internet Protocol.

When the same network address is used in an infrastructure network and a P2P network, a communication apparatus having a plurality of network interfaces as described above cannot determine whether it should transmit a packet to the infrastructure network or to the P2P network. It is not desirable from a security perspective because, in addition to the communication using that packet failing when a packet is transmitted to an erroneous path, the packet flows over an erroneous path over which it should not have in fact flowed.

A technique for avoiding duplication of network addresses in an apparatus that has a plurality of network interfaces is disclosed in Japanese Patent Laid-Open No. 2015-130579 (hereinafter referred to as D1). According to D1, a communication apparatus for distributing addresses in a P2P network decides IP addresses so that there is no duplication of network addresses used in the infrastructure network, and distributes them to opposing apparatuses. By a method of addressing of D1, in a communication apparatus that is connected to a plurality of different networks, it becomes possible to use different IP addresses on respective networks, and it becomes possible to perform communication simultaneously by a plurality of networks.

However, there are cases in which a network address used in an infrastructure network is changed due to a setting of a DHCP server operating on the infrastructure network being changed, provision of an address being received from a different DHCP server, or the like. There is the possibility that when a network address that is used in an infrastructure network is changed in this way, it will become the same as a network address that is being used in the P2P network. If a network address used in the infrastructure network becomes the same as a network address being used in the P2P network, the communication apparatus is required to change the network address being used in the P2P network.

In the case of changing the network address of the P2P network, the communication apparatus must reset the IP address for the opposing apparatus belonging to the P2P network and its own interface that is connected to the P2P network. However, in the case that an address is distributed using a DHCP server function, so long as an address reobtainment request message does not arrive from the opposing apparatus operating as the DHCP client, the communication apparatus cannot notify the changed IP address to the opposing apparatus.

SUMMARY OF THE INVENTION

According to embodiments of the present invention a communication apparatus capable of connection to a plurality of networks, which resolves duplication of generated addresses between the networks, and a method of controlling the same are provided.

According to one aspect of the present invention, there is provided a communication apparatus comprising: a first interface configured to connect with a first network; a second interface configured to connect with a second network; a first detection unit configured to detect that an address used in the first network is changed; a second detection unit configured to detect, in a case where it is detected by the first detection unit that the address used in the first network is changed, that the address that is changed in the first network duplicates an address being used in the second network; a disconnection unit configured to, in a case where the duplication of network addresses is detected by the second detection unit, disconnect a connection of a link layer with the second network; and a reconstruction unit configured to, after the disconnection by the disconnection unit, reconstruct the second network using an address which is not duplicated by the changed address.

According to another aspect of the present invention, there is provided a method of controlling of a communication apparatus that includes a first network interface for connecting with a first network and a second network interface for connecting with a second network, the method comprising: detecting that an address used in the first network is changed; detecting, in a case where it is detected that the address used in the first network is changed, that the address that is changed in the first network duplicates an address being used in the second network; in a case where the address duplication is detected, disconnecting a connection of a link layer with the second network; and after the disconnection, reconstructing the second network using an address which is not duplicated by the changed address.

Further features of the present invention will become apparent from the following description of exemplary embodiments (with reference to the attached drawings).

DESCRIPTION OF THE EMBODIMENTS

Hereinafter, referring to the attached figures, embodiments of the present invention will be described.

<First Embodiment>

Figure 1:
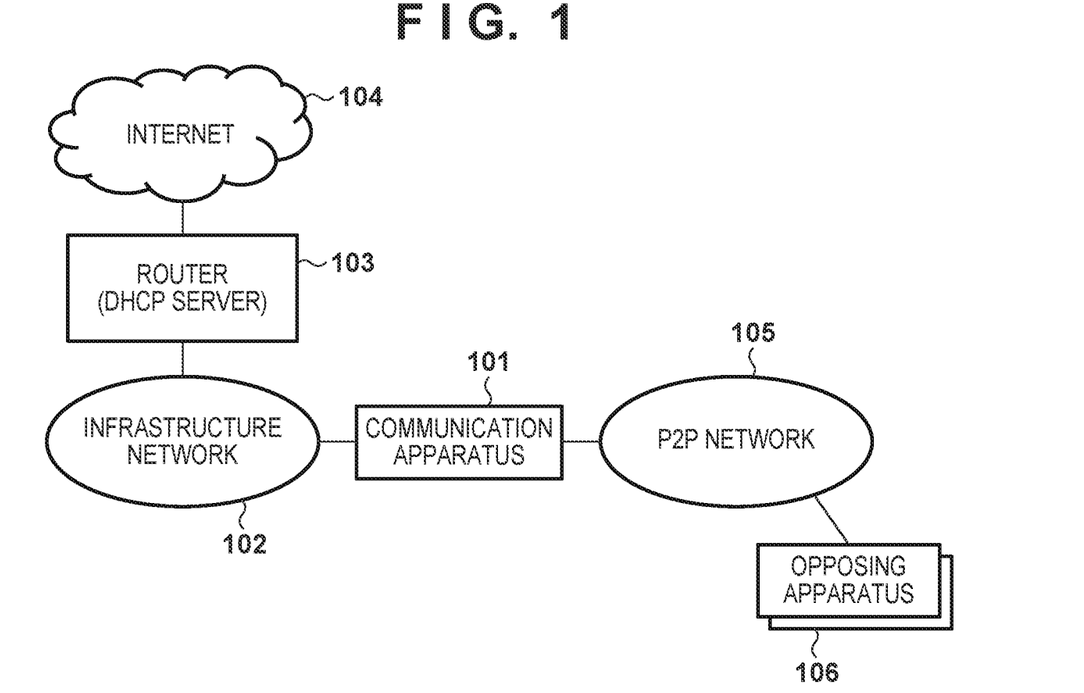
FIG. 1 is a view illustrating a network configuration example according to a first embodiment.

FIG. 1 is a view illustrating an example configuration of a network system and a communication apparatus according to the first embodiment. A communication apparatus 101 has several network interfaces including a first network interface and a second network interface. Regarding the first network interface, for example, communication of an infrastructure mode of wireless LAN is possible, and the first network interface is connected to an infrastructure network 102. A router 103 has a DHCP server function and assigns IP addresses to each apparatus in the infrastructure network 102. Therefore, the first network interface in the communication apparatus 101 uses an IP address issued by the router 103 in the wireless LAN. The infrastructure network 102 can connect to a wide area network such as the Internet 104 via the router 103. Also, it is assumed that the DHCP server function that the router 103 has is used for setting IP addresses, but a configuration in which an independent DHCP server connects to the infrastructure network 102 is also possible.

Also, the second network interface of the communication apparatus 101 constructs a P2P network 105 using a Wi-Fi Direct technique and performs communication with an opposing apparatus 106. The communication apparatus 101 selects a network address that does not duplicate a network address used in the infrastructure network 102 by IP address setting processing described later in FIG. 4, and distributes the IP address to the opposing apparatus 106 in the P2P network. In the present embodiment, an example in which, upon construction of the P2P network 105, the communication apparatus 101 becomes a Wi-Fi Direct Group Owner (GO) and distributes an IP address to the opposing apparatus 106 is described, but limitation is not made to this. Configuration may be taken in which, to construct a P2P network, the communication apparatus 101 operates as a simple access point and distributes an IP address to the opposing apparatus 106. Note that in the following explanation, the first network interface is described as an infrastructure-side interface, and the second network interface is described a P2P-side interface.

Figure 2:
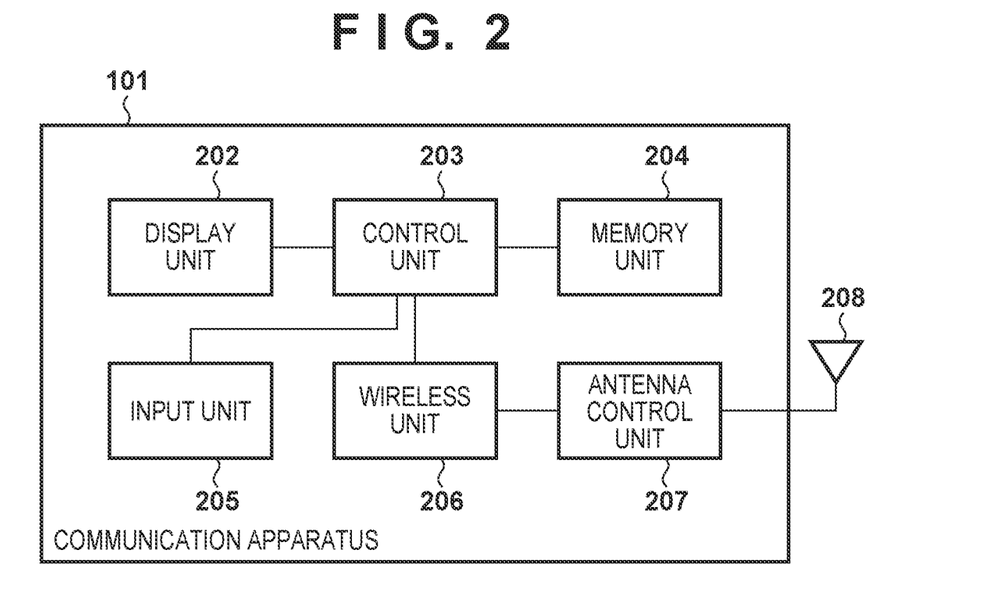
FIG. 2 is a block diagram illustrating a hardware configuration of a communication apparatus according to the first embodiment.

FIG. 2 is a hardware functional block diagram representing an example configuration of the communication apparatus 101. A display unit 202 can output information in a form that a user can recognize visibly, as with an LCD or LED, or a form that a user can recognize aurally, as with a speaker. A control unit 203 controls the communication apparatus 101 on the whole by executing control programs that are stored in a memory unit 204. The memory unit 204 stores control programs executed by the control unit 203. Each kind of operation by the control unit 203 described later, is performed by the control unit 203 executing a control program stored in the memory unit 204. An input unit 205 includes a keyboard and a pointing device, for example. A user can instruct a terminal limited number of the network by the input unit 205, for example. A wireless unit 206 performs a wireless communication using an antenna control unit 207. An antenna 208 is controlled by the antenna control unit 207.

The communication apparatus 101 in the present embodiment is assumed to be used to connect to the infrastructure network 102 and to the P2P network 105 by virtual management of the single antenna 208 as two network interfaces. In such a case, the antenna 208 is used commonly for the infrastructure network 102 and the P2P network 105, limitation is not of course made to such an embodiment, and a configuration that physically has several antennas may be used. Also, a configuration having interfaces for connecting to wired networks may be used in place of the antenna for connecting to wireless networks.

Figure 3:
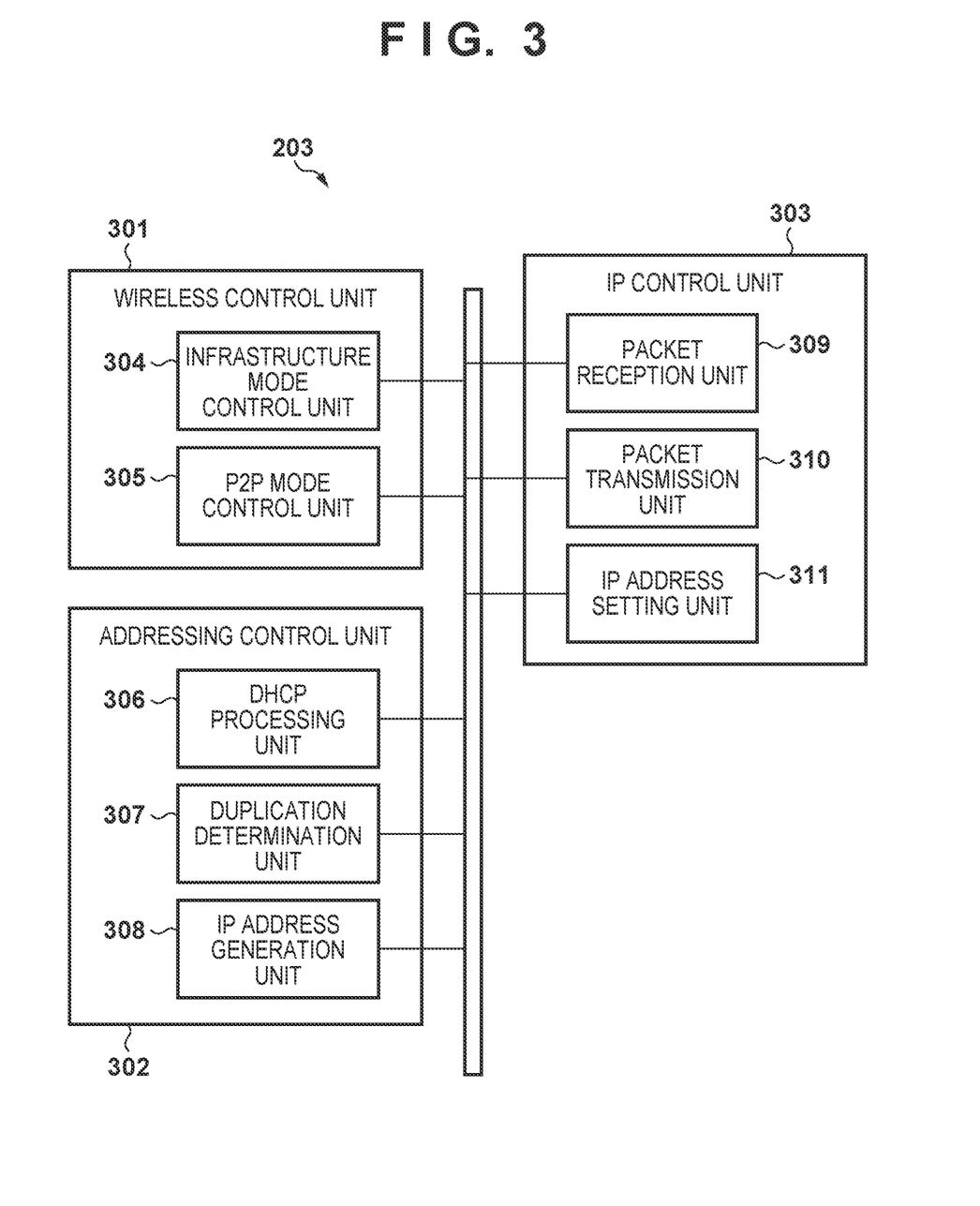
FIG. 3 is a block diagram illustrating a functional configuration of the communication apparatus according to the first embodiment.

FIG. 3 is a block diagram representing an example configuration of functional blocks realized by software that the control unit 203 executes.

A wireless control unit 301 includes an infrastructure mode control unit 304 and a P2P mode control unit 305, and controls the wireless unit 206. An addressing control unit 302 includes a DHCP processing unit 306, a duplication determination unit 307, and an IP address generation unit 308, and controls IP addressing. An IP control unit 303 includes a packet reception unit 309, a packet transmission unit 310, and an IP address setting unit 311, and performs IP communication control.

The infrastructure mode control unit 304 controls infrastructure mode wireless communication. The P2P mode control unit 305 controls P2P communication such as Wi-Fi Direct. The DHCP processing unit 306 performs DHCP protocol processing, and provides a DHCP server function. The duplication determination unit 307 determines whether network addresses of IP addresses that the communication apparatus 101 has (IP addresses of the P2P network and the infrastructure network) are not duplicated. The IP address generation unit 308 decides an IP address to assign to the network interface connected to the P2P network or an IP address range to distribute to the P2P network. The packet reception unit 309 receives packets used in communication. The packet transmission unit 310 transmits packets used in communication. The IP address setting unit 311 performs registration, change, and deletion of IP addresses in relation to network interfaces.

IP address setting processing and IP address resetting processing by the communication apparatus 101 of the present embodiment having the above configuration are described below.

Figure 4:
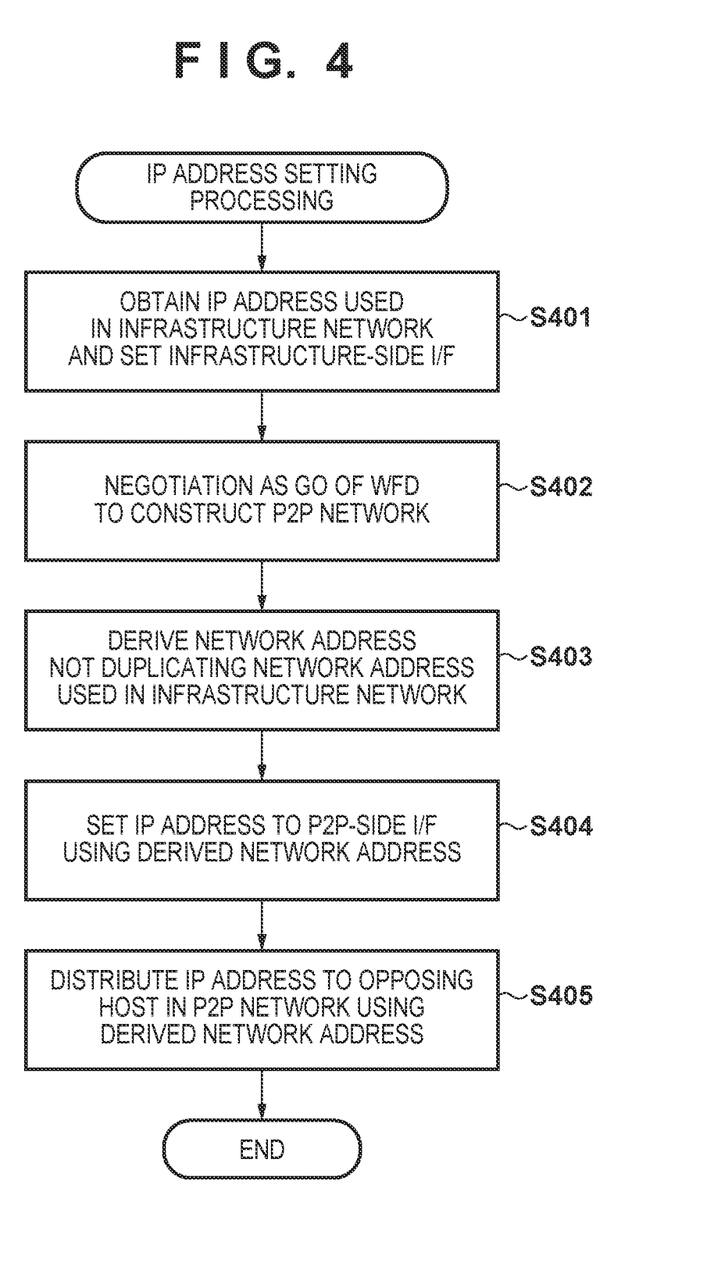
FIG. 4 is a flowchart illustrating IP address setting processing in the first embodiment.

FIG. 4 is a flowchart for describing processing in which the communication apparatus 101 sets an IP address used in the P2P network 105 so not to duplicate an IP address used in the infrastructure network 102. Note that hereinafter network addresses of IP addresses being duplicated means that, for example, addresses (hereinafter referred to as network addresses) of a network part in IP addresses configured from a network part and a host part match.

In step S401, the infrastructure mode control unit 304 obtains an IP address assigned by a DHCP server function of the router 103, and sets an infrastructure-side interface. Next, in step S402, the P2P mode control unit 305 operates as the Wi-Fi Direct (WFD) group owner (GO) and starts a negotiation to construct a P2P network. In step S403, the DHCP processing unit 306 derives a network address that does not duplicate a network address of the infrastructure network. In step S404, the IP address generation unit 308 generates an IP address using the network address derived in step S403 and sets it to the P2P-side interface. In step S405, the IP address generation unit 308 generates an IP address using the network address derived in step S403 and the DHCP processing unit 306 distributes the generated IP address to the opposing apparatus 106 in the P2P network 105. Then, the negotiation for generating the P2P network ends.

Figure 5:
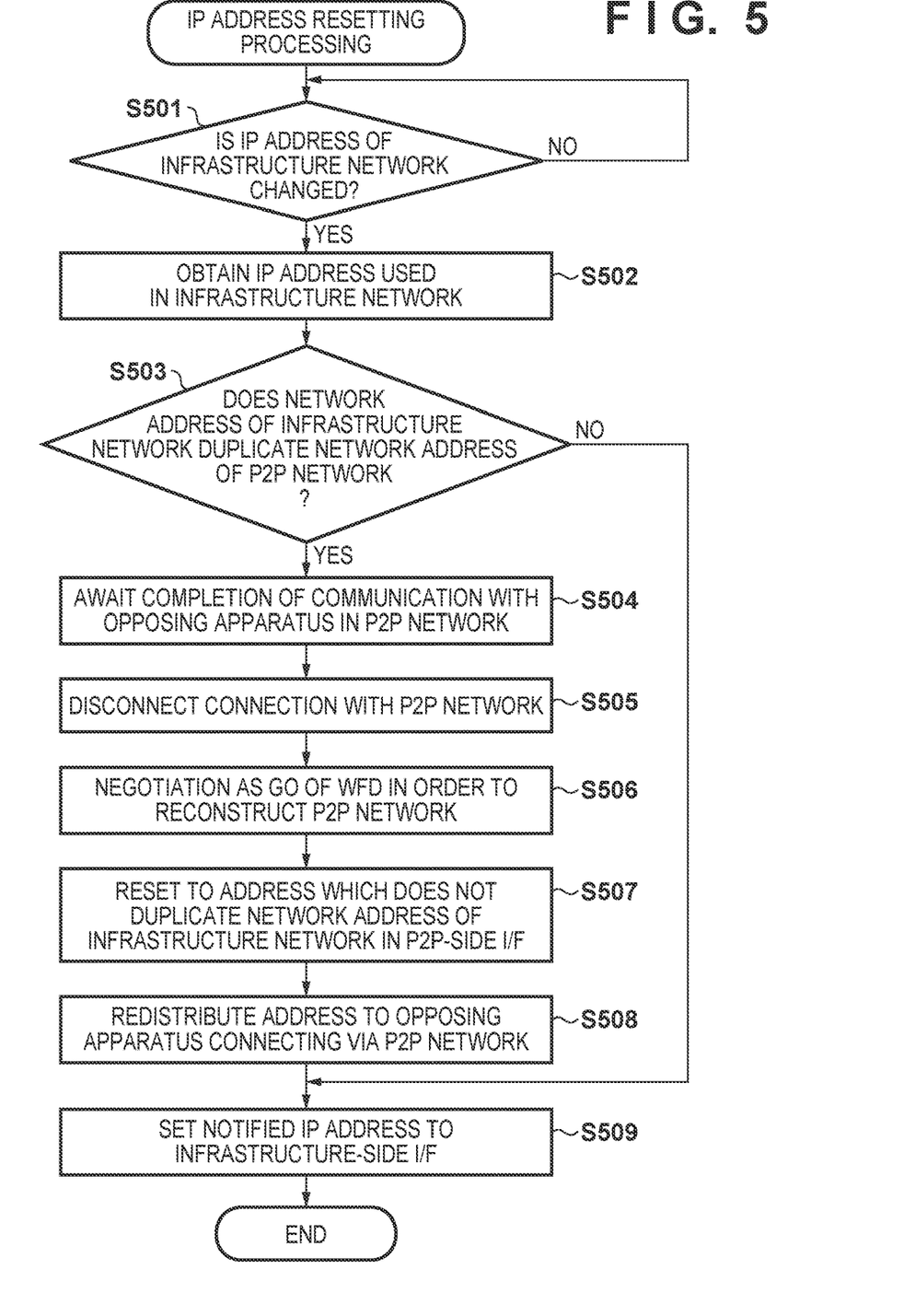
FIG. 5 is a flowchart illustrating IP address resetting processing in the first embodiment.

Next, description is given for IP address resetting processing in a case in which an IP address used in the infrastructure network 102 is changed, and network addresses of the infrastructure network 102 and the P2P network 105 end up being duplicates. The IP address reset in the resetting processing is an IP address used in the P2P network 105. FIG. 5 is a flowchart illustrating IP address resetting processing by the communication apparatus 101 of the first embodiment. Note that before initiation of the processing illustrated in FIG. 5, an IP address used in the infrastructure network 102 and an IP address used in the P2P network 105 are assigned by the processing described above according to FIG. 4.

In step S501, the infrastructure mode control unit 304 determines whether or not a notification of a change of an IP address in the infrastructure network 102 is received. When an IP address used in the infrastructure network 102 is changed due to a change in network settings or the like, the infrastructure mode control unit 304 receives a notification of the change of the IP address from a DHCP server function of the router 103. When a notification of a change of IP address is received, the processing transitions from step S501 to step S502, and the infrastructure mode control unit 304 obtains a new IP address to use in the infrastructure network 102 from the DHCP server function of the router 103.

In step S503, the infrastructure mode control unit 304 determines whether or not the network address of the new IP address obtained in step S502 and the network address of the IP address being used in the P2P network are duplicates. If it is determined that the network addresses are not duplicates, the processing transitions to step S509, and the IP address setting unit 311 sets the IP address for which the notification is received (the IP address obtained in step S502) to the infrastructure network-side interface.

Meanwhile, the processing transitions to step S504 in response to a duplication of the new network address used in the infrastructure network 102 and the network address being used in the P2P network 105 being detected in step S503. By the processing of step S504 to step S508, the network address used in the P2P network is changed so not to duplicate a new network address used in the infrastructure network 102.

In step S504, the P2P mode control unit 305 waits for the communication to complete in a case where a connection that is already established in the P2P network exists. This is because communication being executed in the P2P network 105 ceases to operate normally part way through if an address of the P2P network is changed by later described processing. When the communication completes, the P2P mode control unit 305, in step S505, disconnects a link layer connection with the P2P network 105 to make communication with the P2P network 105 impossible.

Note that in step S504 described above, the completion of the communication that is being executed via the P2P network 105 is awaited and then the connection is disconnected, but there is the possibility that the initiation of communication in the infrastructure network 102 will be delayed due to waiting for the completion of communication. For this reason, configuration may be taken to immediately discard a connection that is established in the P2P network 105, and cause the processing to transition to step S505 if a priority set for communication executed in the infrastructure network 102 is high, for example. Alternatively, configuration may be taken to immediately discard a connection that is established in the P2P network 105 and cause the processing to transition to step S505 unconditionally. Also, configuration may be taken to discard a connection that does not close (communication does not complete) even though a wait time that is set elapses. By this, a connection will be disconnected immediately if time for waiting for completion of the communication that is being executed via the P2P network 105 exceeds a threshold value (the wait time). Also, configuration may be taken to discard a connection based on a priority of a connection that is established in the P2P network. For example, configuration may be taken to discard all connections in the P2P network in response to a connection that has a priority of a threshold value or greater being closed. In such a case, communication that is being executed via the P2P network 105 is discarded and the connection disconnected in response to all communications whose priority is higher than a predetermined level completing among communications being executed via the P2P network 105, for example. Note that configuration may be taken so that a user can set the priority and the wait time from the input unit 205.

After communication with the P2P network 105 is disconnected in step S505, the P2P mode control unit 305 reconstructs the P2P network in steps S506-S508. At this time, if it is necessary to continue communication with the opposing apparatus 106 which belonged to the P2P network prior to the disconnection, processing for a negotiation for construction of the P2P network using Wi-Fi Direct is once again initiated.

In step S506, the P2P mode control unit 305 performs negotiation processing to be able to operate as a Wi-Fi Direct GO. In step S507, the IP address generation unit 308 derives IP addresses from a network address that does not duplicate the network address of the IP address used in the infrastructure network obtained in step S502. The IP addresses that are derived here are an IP address set to the P2P network interface of the communication apparatus 101 and an IP address distributed to the opposing apparatus 106 that belongs to the P2P network. In step S508, the IP address setting unit 311, after adding the IP address generated in step S507 to the P2P network interface, distributes the IP address to the opposing apparatus that is connected via the P2P network. With this, the P2P mode control unit 305 can reconstruct the P2P network 105 to use a network address that does not duplicate a network address being used in the infrastructure network 102.

If the foregoing processing is performed and the address setting for the P2P network 105 completes, the IP address setting unit 311, in step S509, sets the IP address for which the notification is received in step S502 to the infrastructure network-side interface.

As described above, in accordance with the first embodiment, it is possible to reconstruct a P2P network with an appropriate network address in a case where a duplication of a network address being used in a P2P network occurred due to a change of a network address of an infrastructure network. In particular, by re-establishing a connection of the P2P network 105 after once disconnecting it, it becomes possible to distribute the address to the opposing apparatus without waiting for an address reobtainment request from the opposing apparatus of the P2P network. Accordingly, even if there is a duplication of a network address being used in the P2P network due to a network address that is used in the infrastructure network being changed, an IP address reset is performed in the P2P network quickly. The result of this is that it becomes possible to continue communication on both the infrastructure network and the P2P network.

Note that in the foregoing embodiment, processing for setting the IP address that is obtained newly to the infrastructure network interface is not limited to being executed in step S509. It may be performed at a timing after step S505 (a state in which the connection with the P2P network 105 is disconnected). If a newly obtained IP address is set to the infrastructure network interface at an early timing, it is possible to initiate communication with the infrastructure network 102 at an earlier stage.

<Second Embodiment>

Next a second embodiment is described in detail with reference to the drawings. Note that the configuration of the network system and the configuration of the communication apparatus in the second embodiment are similar to in the first embodiment (FIG. 1 to FIG. 3). In the second embodiment, if a duplication occurs in network addresses of the infrastructure network and the P2P network, the duplication of network addresses is resolved by deleting connection information of both networks, and causing the IP address setting processing illustrated in FIG. 4 to be executed once again. Below, with reference to the flowchart of FIG. 6, description will be given regarding IP address resetting processing according to the second embodiment.

Figure 6:
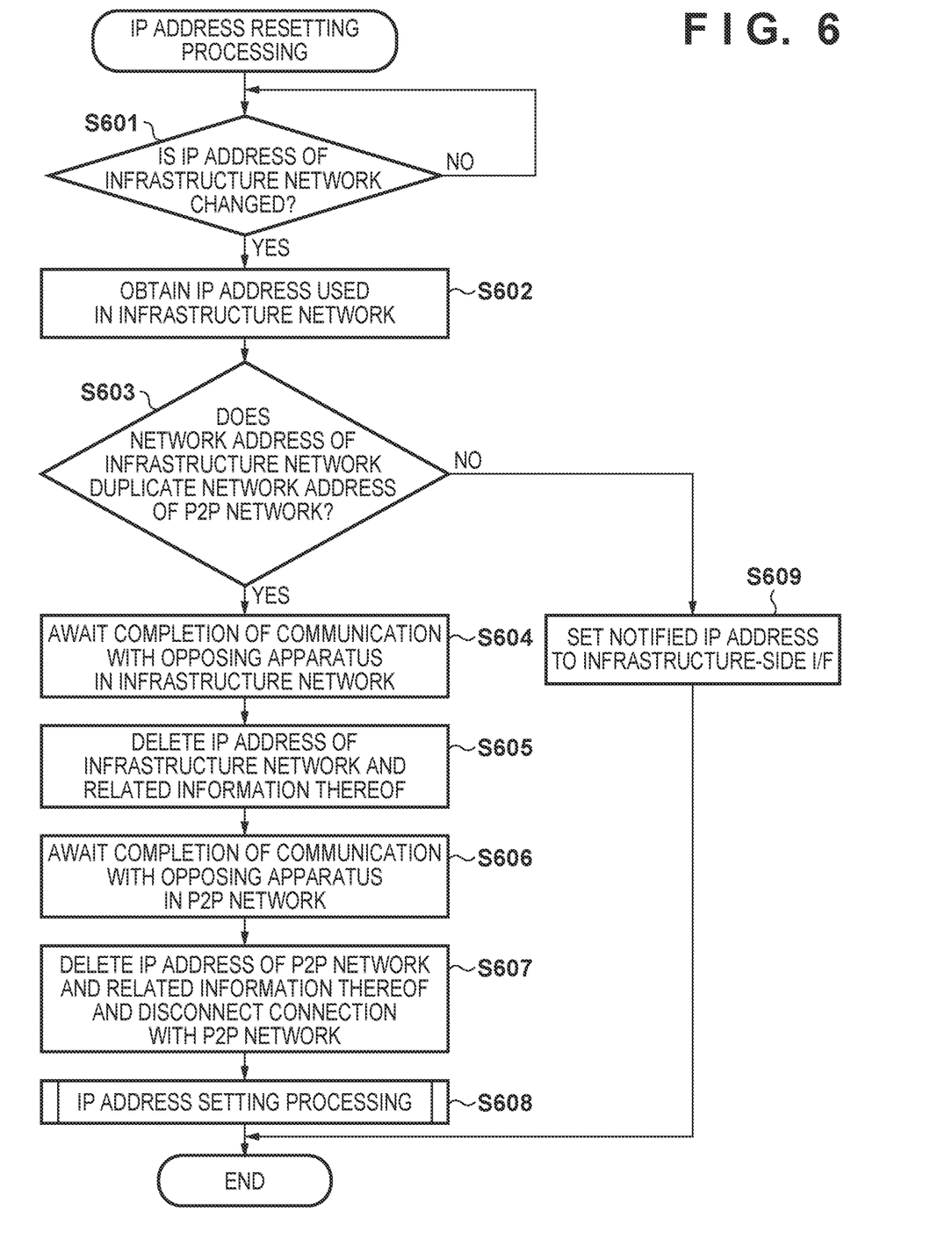
FIG. 6 is a flowchart illustrating the IP address resetting processing a second embodiment.

In FIG. 6, step S601 to step S603 and step S609 are similar to step S501 to step S503 and step S509 of the first embodiment (FIG. 5). In step S604, the infrastructure mode control unit 304 waits for completion of communication being executed in the infrastructure network 102. This processing is something that executes, in relation to the infrastructure network 102, similar processing to the processing of waiting for the communication of the P2P network 105 completing that is described above in relation to step S504. When the communication being executed in the infrastructure network 102 completes, the infrastructure mode control unit 304, in step S605, deletes the IP address set to the infrastructure-side interface and information related thereto. In the related information of the IP address here, cache information such as, for example, routing and DNS server information, an address resolution protocol (ARP), or the like is included.

Note that in the method of waiting until completion of communication of the infrastructure network 102 in step S604, the following variation is given similarly to with step S504. For example, configuration may be taken so as wait for communication being executed via the infrastructure network 102 to complete, and to immediately execute deletion (step S605) if time for waiting for completion of the communication that is being executed exceeds a threshold value. Also, configuration may be taken so that communication that is being executed via the infrastructure network 102 is discarded and deletion is performed (step S605) if all communications whose priority is higher than a predetermined level among communications being executed via the infrastructure network 102 complete, for example. Alternatively, configuration may be taken so as to immediately discard communication being executed via the infrastructure network 102 unconditionally, and execute deletion (step S605).

In step S606 that follows, the P2P mode control unit 305 waits for the communication to complete in a case where a connection that is already established in the P2P network exists. The processing of step S606 is similar to step S504 of the first embodiment (FIG. 5). When the communication being executed in the P2P network 105 completes, the P2P mode control unit 305, in step S607, deletes the IP address set to the P2P-side interface and information related thereto. This processing is similar to what the infrastructure mode control unit 304 executes in relation to the infrastructure-side interface in step S605. After that, similarly to in step S505 of the first embodiment (FIG. 5), the link layer connection with the P2P network 105 is disconnected.

By performing the foregoing processing, a state in which the IP address and information related thereto are not set for the communication apparatus 101 is entered. After that, in step S608, the IP address setting processing illustrated in FIG. 4 is executed once again. In this way, in step S608, after executing deletion of the infrastructure network IP address and information related thereto in step S605, the IP address used in the communication in the infrastructure network 102 is obtained once again. Also, in step S608, after disconnecting the connection with the P2P network 105 in step S607, reobtainment and redistribution of the IP address used in the communication in the P2P network 105 is executed.

As described above, by virtue of the second embodiment, it becomes possible to realize duplicate network address resolution while enhancing processing reusability, though redundant processing for deleting address information of the infrastructure network 102 and executing reobtainment of an address occurs.

Also, in the second embodiment, the IP address set to the infrastructure-side interface is reobtained by the IP address setting processing in step S608. Time for waiting for the completion of communication being executed on the infrastructure network and the P2P network is included within from when step S602 is executed to when step S608 is executed. There are cases in which the IP address received in the notification in step S602 ends up being unusable due to a time difference occurring in the timing from when the notification of the IP address of the infrastructure network is made to obtainment in this way. For example, cases in which a REQUEST packet is transmitted to set the IP address after the DHCP client (the communication apparatus 101) receives (step S602) an OFFER packet from the DHCP server and the processing of step S604 to step S607 is performed are envisioned. In such cases, there is the possibility that the DHCP server will end up waiting for the reception of the REQUEST packet after transmitting the OFFER packet, and receive an address request from another client while waiting for the REQUEST packet. There are cases in which if, in such a state, an address request is received from another client, and there is no address that is not distributed to an address space of the DHCP server, the DHCP server will distribute the IP address notified by the OFFER packet as described above to the other client. In a case such as is described above, an address conflict with the other communication apparatus may occur. With respect to this, in the second embodiment, it becomes possible to avoid such a conflict because the IP address is reobtained in step S608.

<Other Embodiments>

The present invention can be realized by combining the foregoing first and second embodiments. For example, configuration may be taken to execute the processing for deleting the related information of the IP address that is executed in step S607 of the second embodiment in the processing of step S505 of the first embodiment.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-052966, filed Mar. 16, 2016, which is hereby incorporated by reference herein in its entirety.

What is claimed is:

1. A communication apparatus comprising:
one or more processors; and
one or more memories including instructions that, when executed by the one or more processors, cause the communication apparatus to:
obtain, while communicating on a first network using a first network address, a second network address as a network address used in the first network, which is different from the first network address;
detect conflict of the obtained second network address and a third network address being used in a second network;
delete information related to the first network address used in the first network in response to the detection of the conflict of the second network address and the third network address;
newly obtain a network address to use in a communication in the first network in response to the information related to the first network address used in the first network being deleted;
disconnect a connection of a link layer with the second network in response to the detection of the conflict of the second network address and the third network address; and
reconstruct connection to the second network using a network address which does not conflict with the newly obtained network address.

2. The communication apparatus according to claim 1, wherein the instructions, when executed by the one or more processors, cause the communication apparatus to await a completion of a communication being performed via the second network and then disconnect the connection.

3. The communication apparatus according to claim 1, wherein in disconnecting the connection, the instructions, when executed by the one or more processors, cause the communication apparatus to, before a communication being performed via the second network completes, disconnect the connection in accordance with time for waiting for the completion of the communication exceeding a threshold value.

4. The communication apparatus according to claim 1, wherein the instructions, when executed by the one or more processors, cause the communication apparatus to, in a case where all communications whose priority is higher than a predetermined level, among communications being performed via the second network, are completed, terminate communication being performing via the second network and then disconnect the connection.

5. The communication apparatus according to claim 1, wherein the instructions, when executed by the one or more processors, cause the communication apparatus to, in response to the conflict of the second network address and the third network address being detected, terminate communication being performed via the second network and then disconnect the connection.

6. The communication apparatus according to claim 1, wherein the instructions, when executed by the one or more processors, cause the communication apparatus to await a completion of a communication being performed via the first network and then delete the information related to the first network address used in the first network.

7. The communication apparatus according to claim 6, wherein the instructions, when executed by the one or more processors, cause the communication apparatus to, even before the communication being performed via the first network completes, delete the information related to the first network address used in the first network in accordance with time for waiting for the completion of the communication exceeding a threshold value.

8. The communication apparatus according to claim 1, wherein the instructions, when executed by the one or more processors, cause the communication apparatus to, in a case where all communications whose priority is higher than a predetermined level, among communications being performed via the first network, are completed, terminate communication being performing via the first network and then delete the information related to the first network address used in the first network.

9. The communication apparatus according to claim 1, wherein the instructions, when executed by the one or more processors, cause the communication apparatus to, in response to the conflict of the second network address and the third network address being detected, terminate communication being performed via the first network and then delete the information related to the first network address used in the first network.

10. The communication apparatus according to claim 1, wherein the instructions, when executed by the one or more processors, cause the communication apparatus to obtain an IP address as the second network address.

11. A method of controlling of a communication apparatus, the method comprising:

obtaining, while communicating on a first network using a first network address, a second network address as a network address used in the first network, which is different from the first network address;

detecting conflict of the obtained second network address and a third network address being used in a second network;

deleting information related to the first network address used in the first network in response to the detection of the conflict of the second network address and third network address;

newly obtaining a network address to use in a communication in the first network in response to the information related to the first network address used in the first network being deleted;

disconnecting a connection of a link layer with the second network in response to the detection of the conflict of the second network address and the third network address; and reconstructing connection to the second network using a network address which does not conflict with the newly obtained network address.

12. A non-transitory computer-readable storage medium storing a program for causing a computer to execute a method of controlling of a communication apparatus, the method comprising:

obtaining, while communicating on a first network using a first network address a second network address as a network address used in the first network, which is different from the first network address;

detecting conflict of the obtained second network address and a third network address being used in a second network;

deleting information related to the first network address used in the first network in response to the detection of the conflict of the second network address and the third network address;

newly obtaining a network address to use in a communication in the first network, in response to that the information related to the first network address used in the first network being deleted;

disconnecting a connection of a link layer with the second network in response to the detection of the conflict of the second network address and the third network address; and reconstructing connection to the second network using a network address which does not conflict with the newly obtained network address.

* * * * *